(12) United States Patent
Korkinof

(10) Patent No.: US 12,705,535 B2
(45) Date of Patent: Aug. 11, 2026

(54) SYSTEMS AND METHODS FOR GROUPING RECORDS ASSOCIATED WITH LIKE MEDIA ITEMS

(71) Applicant: Spotify AB, Stockholm (SE)

(72) Inventor: Dimitrios Korkinof, Surrey (GB)

(73) Assignee: Spotify AB, Stockholm (SE)

( * ) Notice: Subject to any disclaimer, the term of this patent is extended or adjusted under 35 U.S.C. 154(b) by 815 days.

(21) Appl. No.: 18/159,633

(22) Filed: Jan. 25, 2023

(65) Prior Publication Data

US 2024/0185123 A1 Jun. 6, 2024

(30) Foreign Application Priority Data

Dec. 2, 2022 (GR) .............................. 20220101000

(51) Int. Cl.
*G06N 20/00* (2019.01)

(52) U.S. Cl.
CPC .................................... *G06N 20/00* (2019.01)

(58) Field of Classification Search
CPC ............................... G06N 20/00; G06N 3/045
See application file for complete search history.

(56) References Cited

U.S. PATENT DOCUMENTS 11,216,701 B1 1/2022 Sim et al.
12,475,671 B2 * 11/2025 Treder ................ H04N 19/167
2021/0034977 A1 2/2021 Arik et al.
2021/0065047 A1 3/2021 Shi et al.
2021/0097427 A1 4/2021 Clark et al.
2022/0067280 A1 * 3/2022 Wagner ................ G06N 3/0895
2022/0207543 A1 * 6/2022 Shah .................. G06Q 30/0203
2024/0006080 A1 * 1/2024 Molero Leon ......... G16H 10/60
2024/0098338 A1 * 3/2024 Gupta ................. G06F 16/7867
2025/0022615 A1 * 1/2025 Corneil .................. G06N 3/042
2025/0090963 A1 * 3/2025 Skordilis ............. H03M 7/6041
2025/0140249 A1 * 5/2025 Sharifi .................. G10L 15/183

OTHER PUBLICATIONS

P. Dahal, "Learning Embedding Space for Clustering From Deep Representations", 2018 (Year: 2018).*

(Continued)

*Primary Examiner* — Kamran Afshar
*Assistant Examiner* — Majd Maher Haddad
(74) *Attorney, Agent, or Firm* — Morgan, Lewis & Bockius LLP

(57) ABSTRACT

An electronic system obtains a first plurality of records corresponding to a plurality of media items, wherein each record of the first plurality of records has at least one attribute of a plurality of attributes. The electronic system trains a machine-learning model by, for each record of the first plurality of records, masking a portion of an attribute of the record. An encoder of the machine-learning model produces a training embedding for the record, and a decoder of the machine-learning model predicts the masked portion of the attribute of the record, based on the training embedding. The electronic system uses the trained machine-learning model to produce an embedding for each record of a second plurality of records, and groups two or more records of the second plurality of records into a first group based on the embeddings of the two or more records.

18 Claims, 9 Drawing Sheets

(56) References Cited

OTHER PUBLICATIONS

W. Zhang, "AutoBlock: A Hands-off Blocking Framework for Entity Matching", 2019 (Year: 2019).*
J. Wei, "A stratification method based on clustering for the minimization of data masking effect in signal detection", 2020 (Year: 2020).*
Zhang et al., "AutoBlock: A Hands-off Blocking Framework for Entity Matching", arxiv.org, WSDM '20: Proceedings of the 13$^{th}$ International Conference on Web Search and Data Mining, Jan. 22, 2020, 10 pgs.

* cited by examiner

500

502 Obtain a first plurality of records corresponding to a plurality of media items, wherein each record of the first plurality of records has at least one attribute of a plurality of attributes.

504 The at least one attribute of the plurality of attributes includes one or more of a title of a media item, an album of the media item, one or more performers of the media item, and one or more writers of the media item corresponding to each record of the first plurality of records.

506 Train a machine-learning model by, for each record of the plurality of records, masking a portion of an attribute of the record.

508 The machine-learning model includes an encoder and a decoder. The encoder produces a training embedding for the record, and the decoder predicts the masked portion of the attribute of the record, based on the training embedding.

510 The encoder is a first encoder that produces a first embedding based on the plurality of attributes. And the machine-learning model further comprises a second encoder that produces a second embedding based on a subset, less than all, of the plurality of attributes.

512 The second embedding produced by the second encoder is an input to the first encoder.

514 The first encoder is a first attribute-level encoder configured to generate a first attribute level embedding for a first attribute. And the machine-learning model further includes a second attribute-level encoder configured to generate a second attribute-level embedding for a second attribute.

516 Use the trained machine-learning model to produce an embedding for each record of a second plurality of records.

518 The embedding is a first embedding, and a tokenizable attribute of each of the second plurality of records is tokenized into a plurality of tokens.

520 A plurality of token embeddings are generated for the plurality of tokens of the tokenizable attribute.

522 A second embedding is generated for each of the second plurality of records based on two or more of the plurality of token embeddings.

524 Group two or more records of the second plurality of records into a first group based on the embeddings of the two or more records.

526 Grouping the two or more records of the second plurality of records includes deduplicating records that correspond to a same media item.

528 Grouping the two or more records of the second plurality of records includes:

analyzing the second plurality of records using a blocking layer, the blocking layer configured to identify a candidate group including a plurality of candidate records greater than the two or more records of the second plurality of records, and analyzing the plurality of candidate records using a matching layer, different from the blocking layer, configured to identify a subset of the plurality of candidate records, wherein the two or more records of the first group include the subset of the plurality of candidate records.

524 Group two or more records of the second plurality of records into a first group based on the embeddings of the two or more records.

530 The machine-learning model determines that a media item corresponding to a first record of the second plurality of records corresponds to a first media item type.

532 In response to a request to add a first media item corresponding to a first record of the second plurality of records to a playlist associated with the first electronic device, determine the first media item is associated with the first group, based on a respective embedding for the first record.

534 In accordance with a determination that the playlist includes a second media item that belongs to the first group, forgo adding the first media item to the playlist to be played back at the first electronic device.

536 In response to a request for a third media item, identify that the third media item is grouped into a first respective group, and select a record from the first respective group based on one or more acoustic parameters.

538 Provide a media item corresponding to the selected record to the first electronic device.

540 In response to a request for a fourth media item, identify that the fourth media item is grouped into a second respective group.

542 Select a record from the second respective group based on respective play counts of respective records in the second group, and provide the selected record to the first electronic device.

FIG. 5C

SYSTEMS AND METHODS FOR GROUPING RECORDS ASSOCIATED WITH LIKE MEDIA ITEMS

RELATED APPLICATION

This application claims priority to Greek Patent Application No. 2410-0004617859, entitled "Systems and Methods for Grouping Records Associated with Like Media Items," filed Dec. 2, 2022, which is hereby incorporated by reference in its entirety.

TECHNICAL FIELD

The disclosed embodiments relate generally to media provider systems including, but not limited to, systems and methods for grouping records associated with similar media items using a machine-learning model.

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. Some tasks, including navigation and discovery, are further complicated by the presence of duplicative digital goods, for which a user may not wish to navigate through each representation thereof (e.g., two songs can be very similar but are still represented as distinct items in, for example, a playlist). Further complications are caused by corrupt, incorrect, or missing data in records associated with such digital goods, which prevent them from being recognized as belong to a group of similar media items.

SUMMARY

A media content provider can use a machine-learning model to group records associated with similar media items, to, for example, improve the presentation of such media items to a user (e.g., when the user is searching for a media item to play, or to add to a playlist) and/or improve the quality of machine-curated playlists and recommendations (e.g., so that duplicates do not occur within a playlist). The machine-learning model is trained by masking portions of a first plurality of records (e.g., in which the records comprise metadata associated with media items) and training the machine-learning model to predict the masked portions and determine whether there is sufficient similarity of embeddings for like media items. Then, the trained machine-learning model generates embeddings for each of a second plurality of records (e.g., in which the respective embeddings comprise an output (e.g., a layer) of the machine-learning model that before (e.g., upstream of) the decoder), and groups two or more records of the second plurality of records using the generated encodings.

The methods described herein use the generated embeddings to determine when two or more representative sets of identifiers correspond to a same respective media item. Specifically, a machine-learning model is trained, such that the trained machine-learning model provides more accurate embeddings for grouping records associated with similar media items (e.g., the machine-learning model is trained to identify when two records correspond to similar media items even when the records have different or incomplete information).

To that end, in accordance with some embodiments, a method is provided. The method is performed at a computing device having one or more processors and memory. The method includes obtaining a first plurality of records corresponding to a plurality of media items, wherein each record of the first plurality of records has at least one attribute of a plurality of attributes. The method further includes training a machine-learning model by, for each record of the first plurality of records, masking a portion of an attribute of the record, where (i) the machine-learning model includes an encoder and a decoder, (ii) the encoder produces a training embedding for the record, and (iii) the decoder predicts the masked portion of the attribute of the record, based on the training embedding. The method further includes using the trained machine-learning model to produce an embedding for each record of a second plurality of records. The method further includes grouping two or more of the second plurality of records into a first group based on the embeddings of the two or more records.

In accordance with some embodiments, an electronic device is provided. The electronic device includes one or more processors and memory storing one or more programs. The one or more programs include instructions for performing any of the methods described herein (e.g., the method 500).

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein (e.g., the method 500).

Thus, systems are provided with improved methods for grouping records associated with like media items.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5C are flow diagrams illustrating a method for using a machine-learning model to group records associated with media items, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
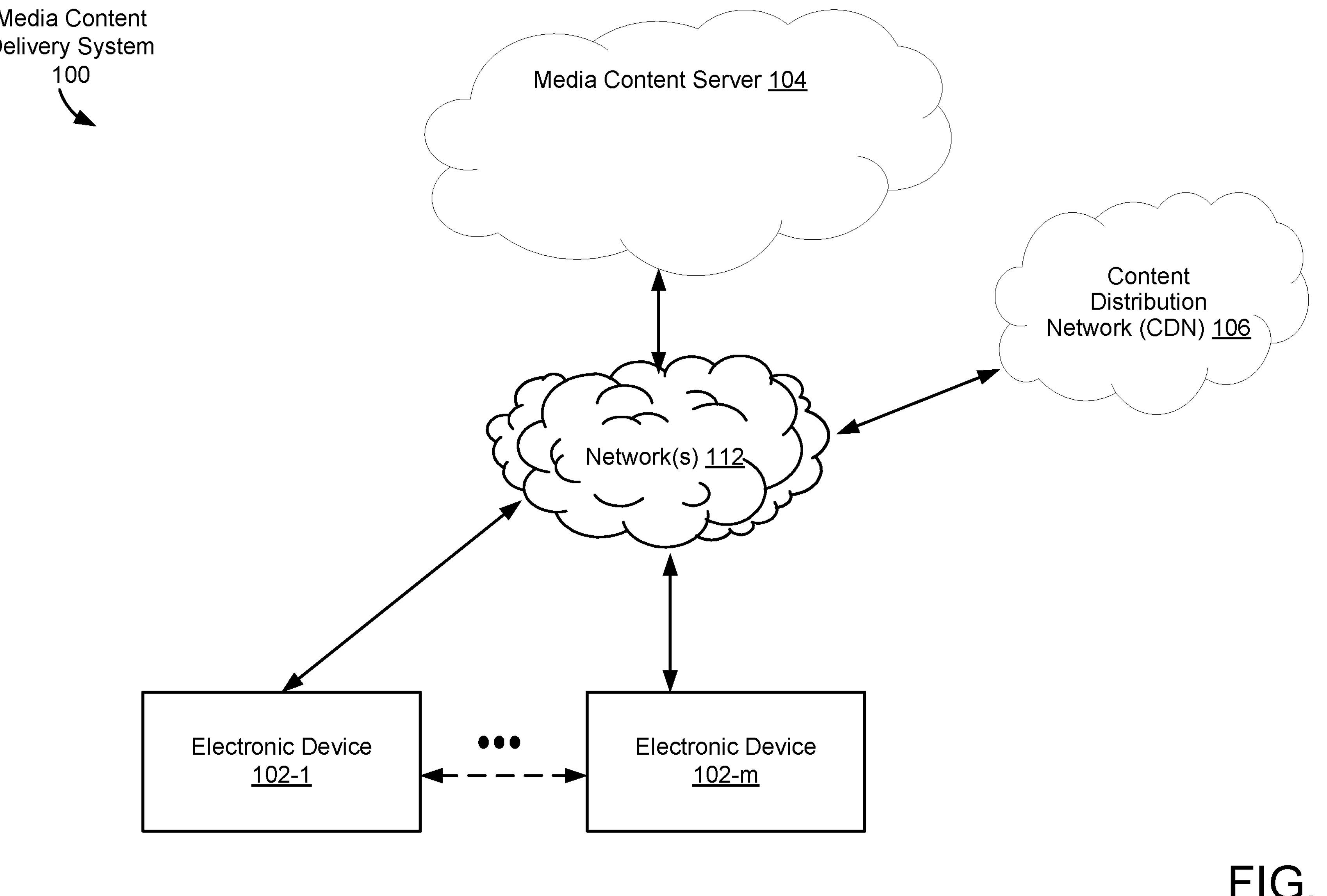
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device **102-*m*, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112** can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and **102-*m* are the same type of device (e.g., electronic device 102-1 and electronic device 102-*m* are both speakers). Alternatively, electronic device 102-1 and electronic device 102-*m*** include two or more different types of devices.

In some embodiments, electronic devices 102-1 and **102-*m* send and receive media-control information through network(s) 112. For example, electronic devices 102-1 and 102-*m* send media control requests (e.g., requests to play music, podcasts, movies, videos, or other media items, or playlists thereof) to media content server 104 through network(s) 112. Additionally, electronic devices 102-1 and 102-*m*, in some embodiments, also send indications of media content items to media content server 104 through network(s) 112. In some embodiments, the media content items are uploaded to electronic devices 102-1 and 102-*m* before the electronic devices forward the media content items to media content server 104**.

In some embodiments, electronic device 102-1 communicates directly with electronic device **102-*m* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-*m*. In some embodiments, electronic device 102-1 communicates with electronic device 102-*m* through network(s) 112. In some embodiments, electronic device 102-1 uses the direct connection with electronic device 102-*m* to stream content (e.g., data for media items) for playback on the electronic device 102-*m***.

In some embodiments, electronic device 102-1 and/or electronic device **102-*m* include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102**.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
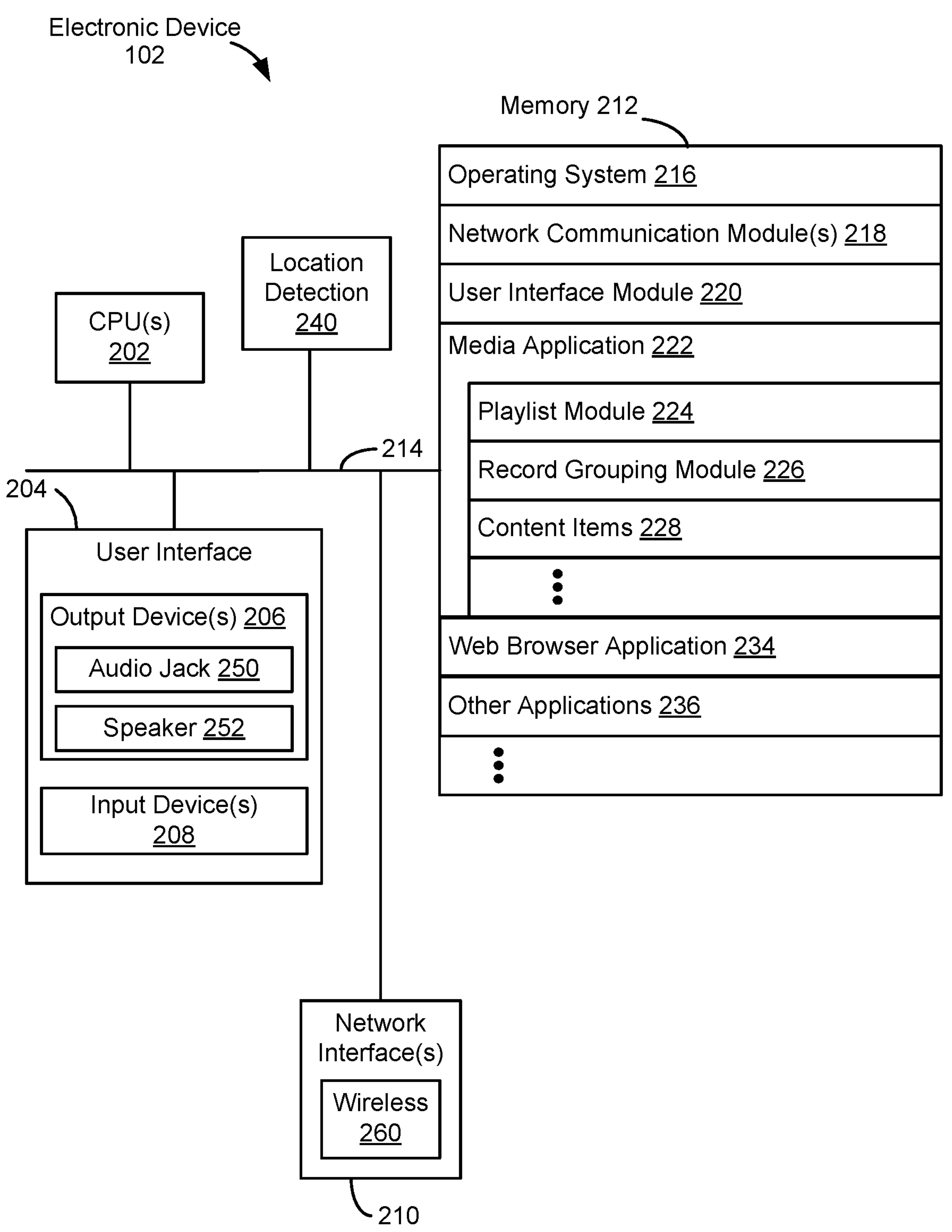
FIG. 2 is a block diagram illustrating an electronic device, in accordance with some embodiments.

FIG. 2 is a block diagram illustrating an electronic device 102 (e.g., electronic device 102-1 and/or electronic device **102-*m*, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214** optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Figure 3:
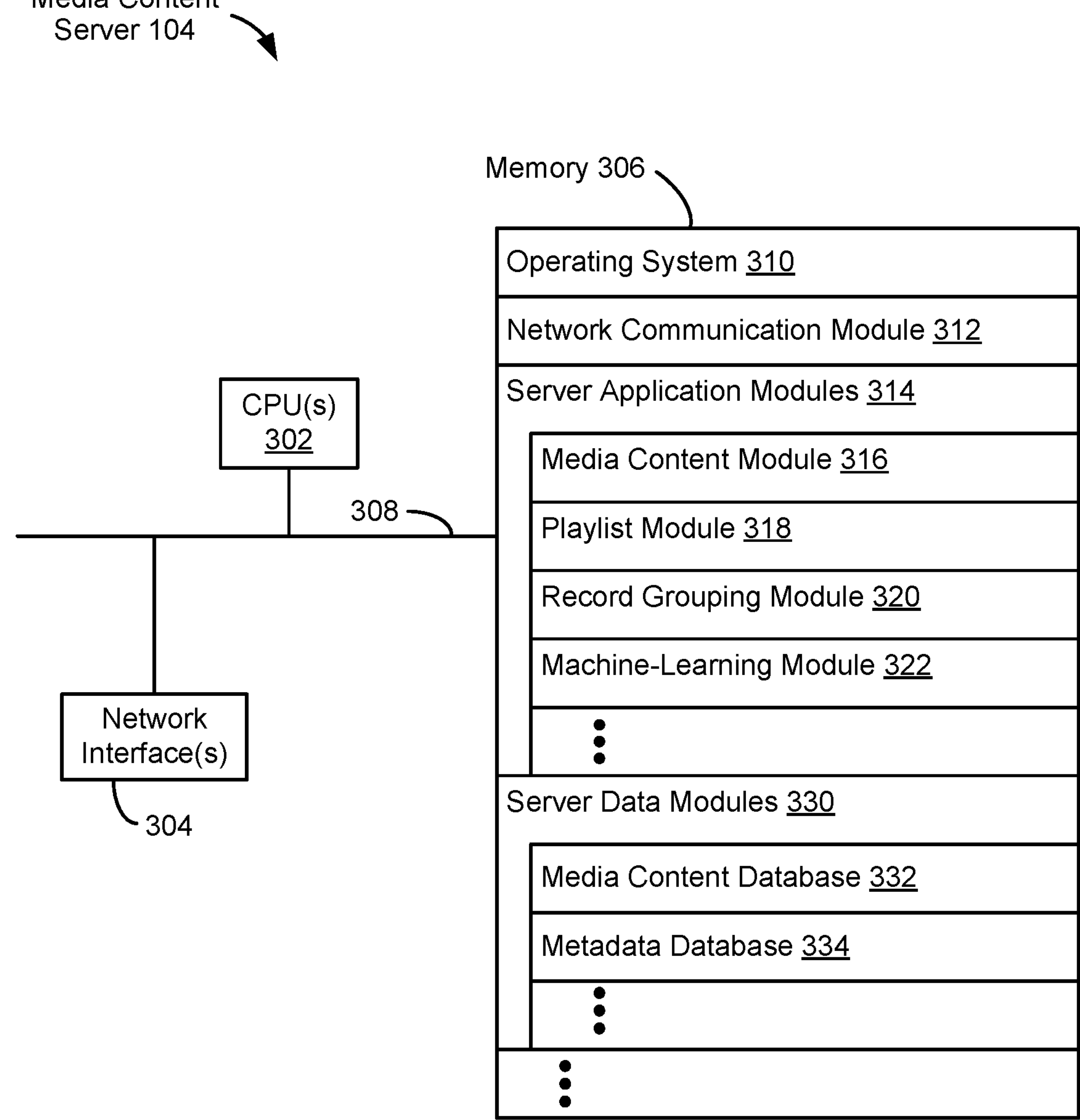
FIG. 3 is a block diagram illustrating a media content server, in accordance with some embodiments.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s), media content server 104, and/or other client devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 also includes the following modules (or sets of instructions), or a subset or superset thereof:

- a playlist module 224 for storing sets of media items for playback in a predefined order, the media items selected by the user (e.g., for a user-curated playlist) and/or the media items curated without user input (e.g., by the media content provider);
- a record grouping module 226 for storing groups of similar media items (and/or metadata related thereto) that have been grouped by a machine-learning module (e.g., machine-learning module 322; FIG. 3);
- a content items module 228 for storing media items, including audio items such as podcasts and songs, for playback and/or for forwarding requests for media content items to the media content server;

a web browser application 234 for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

- a media content module 316 for storing one or more media content items and/or sending (e.g., streaming), to the electronic device, one or more requested media content item(s);
- a playlist module 318 for storing and/or providing (e.g., streaming) sets of media content items to the electronic device;
- a record grouping module 320 for storing groups of similar media items (and/or metadata related thereto) that have been grouped by a machine-learning module (e.g., machine-learning module 322; FIG. 3);
- a machine-learning module 322 configured to determine missing or incorrect attributes of records associated with media items and/or grouping such records based on similarities between media items associated with the grouped records one or more server data module(s) 330 for handling the storage of and/or access to media items and/or metadata relating to the media items; in some embodiments, the one or more server data module(s) 330 include:

- a media content database 332 for storing media items; and
- a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous Javascript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
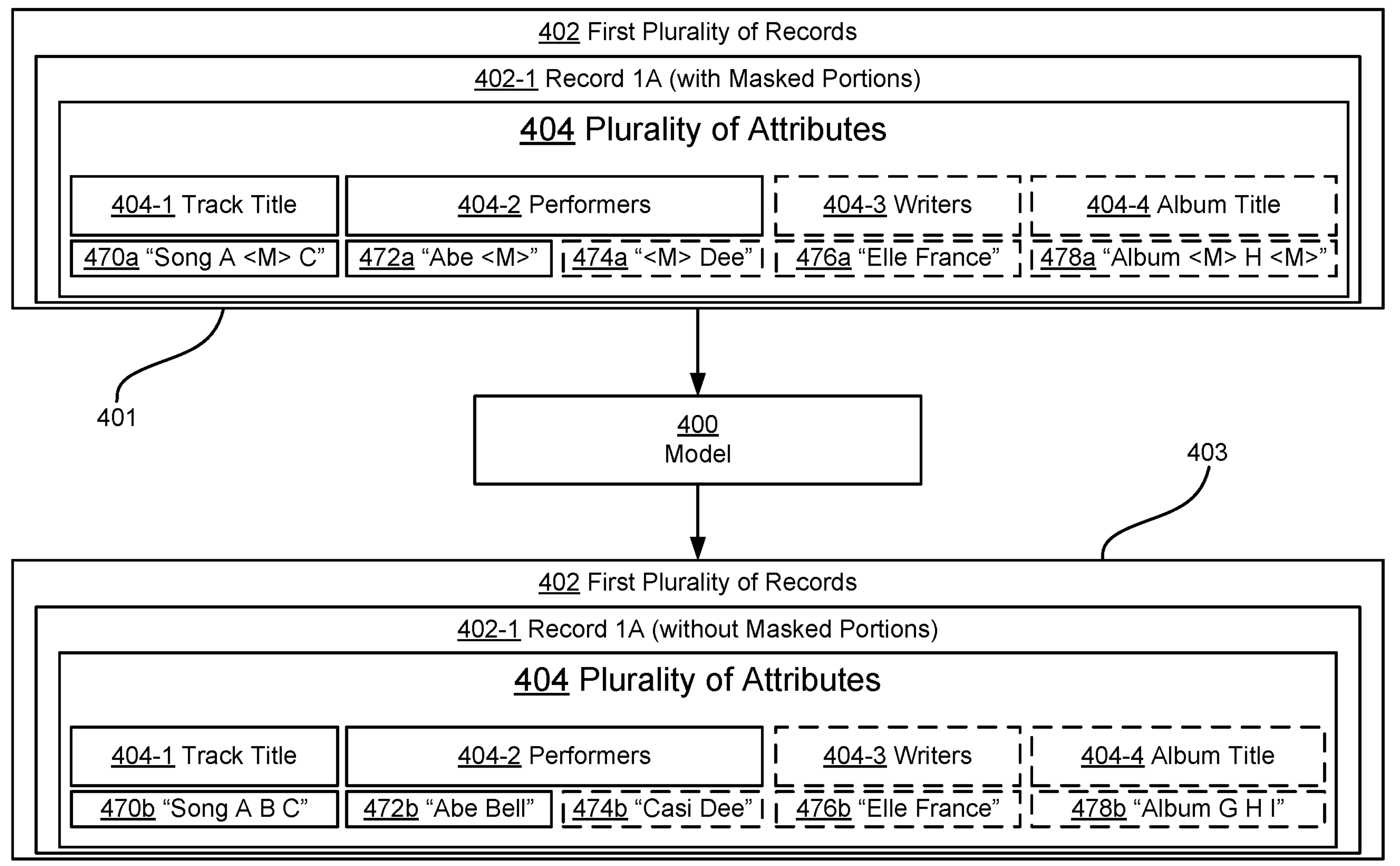
FIGS. 4A-4C are block diagrams illustrating aspects of a machine-learning model for grouping records associated with media items, in accordance with some embodiments.
Figure 4B:
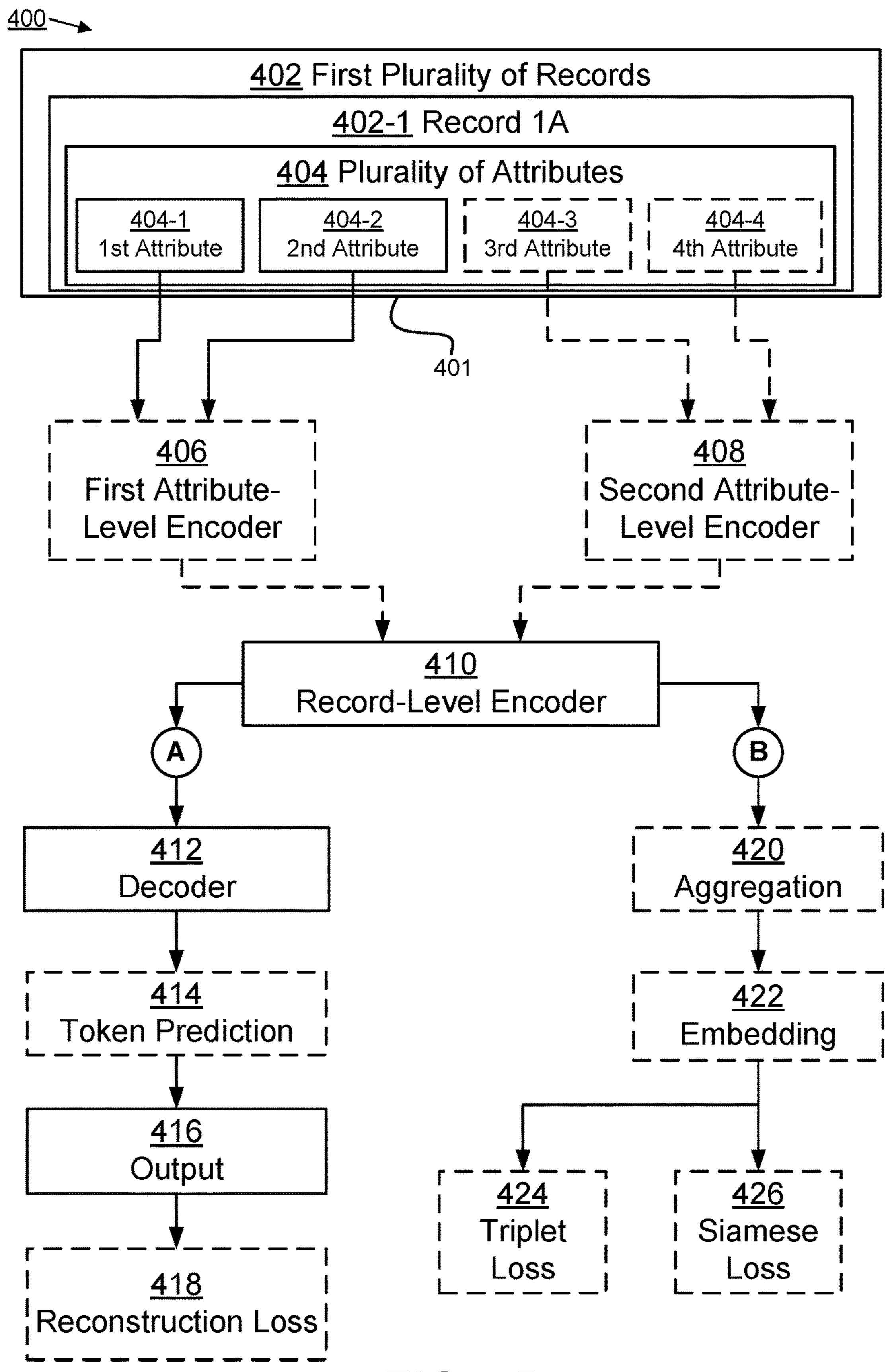
Figure 4C:
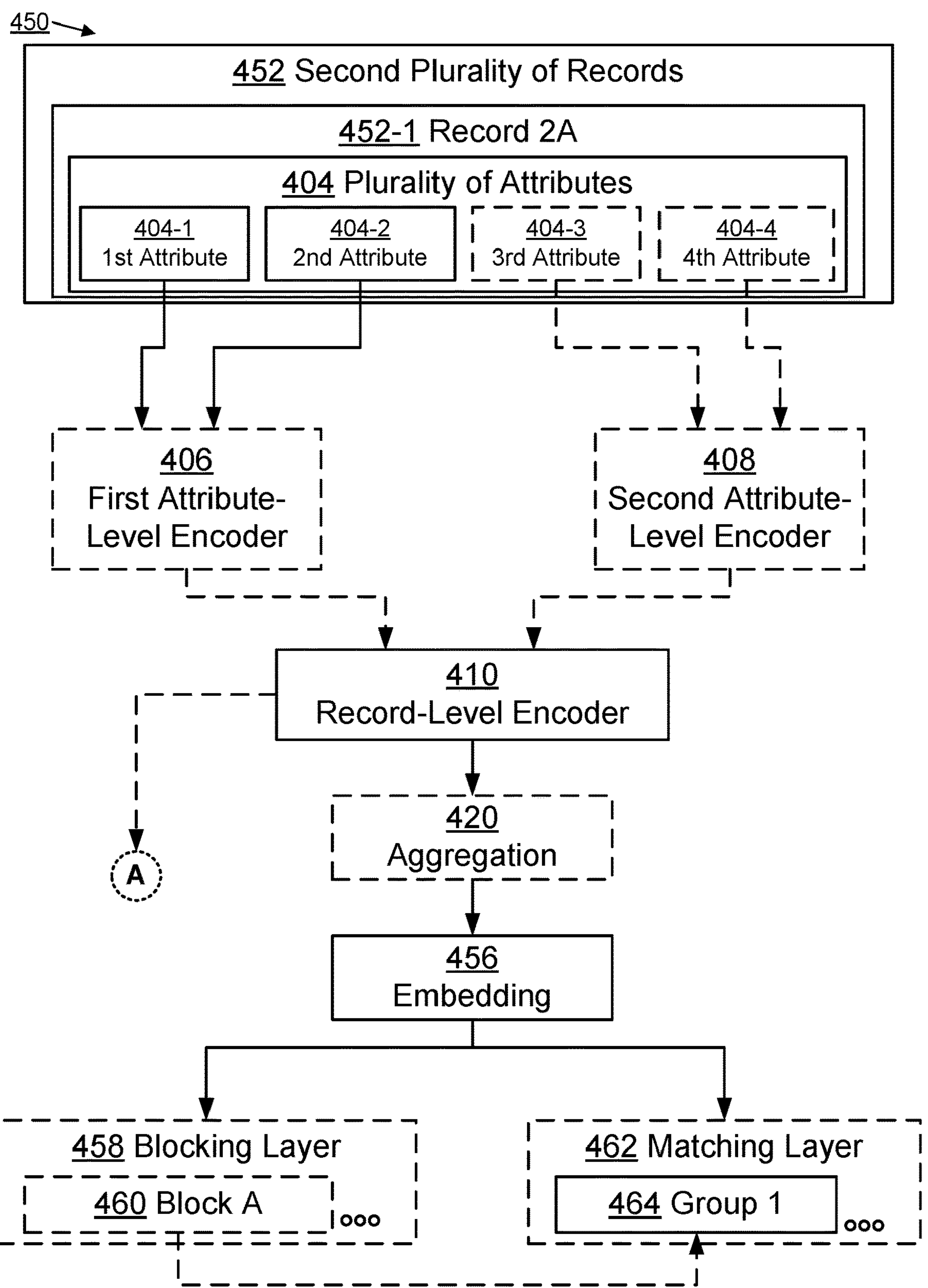

FIGS. 4A-4C are block diagrams illustrating aspects of a machine-learning model for grouping records associated with media items, in accordance with some embodiments. As will be discussed below, the devices, systems, and methods described herein can be used to (i) train a machine-learning model 400 to predict masked portions of attributes of records received as inputs to the machine-learning model, and (ii) use the trained machine-learning model 450 (e.g., the machine-learning model 400 after it has processed a first plurality of records 402) to group records that are associated with similar media items, including records that include missing, corrupt, and/or otherwise incorrect values for one or more attributes of the respective records. A skilled artisan will appreciate that all the operations described herein can include intermediary steps, and/or alternative approaches not described herein to perform the same or similar functions to those described with respect to FIGS. 4A-4C.

FIG. 4A illustrates a machine-learning model 400 configured to receive an input 401 that includes a first plurality of records 402, which includes the record 402-1. In some embodiments, each record is associated with a plurality of attributes. In some embodiments, the first plurality of records (and optionally, one or more attributes of the records) is obtained by one or more data preprocessors. In some embodiments, the data preprocessors fetch or otherwise request (e.g., via an HTTPS request) one or more of the records from an external source. In some embodiments, two or more of the plurality of records are obtained from different sources (e.g., a first and second API, a first and second database, a database, and an API, etc.).

In some embodiments, the first plurality of records includes one or more attributes that are added to the record based on training that has previously been performed by the machine-learning model 400, another machine-learning model, or by other means (e.g., to supplement the one or more attributes obtained by the data preprocessors). In some embodiments, each of the records can be associated with one or more corresponding media items, and include one or more of a track title, artist name, album title track length, etc. For example, a "Track Length" of one or more records of the first plurality of records 402 is calculated based on, for example, media data stored in the record, despite there being no explicit attribute of the record corresponding to the track length of the respective media item.

In some embodiments, one or more records include an International Standard Recording Code (ISRC) identifier, which can be included within raw data (e.g., media data) of the respective media item corresponding to the respective record. In some embodiments, the machine-learning model groups records that have a same ISRC identifier into a same group (e.g., even if other attributes do not match across the records). For example, the ISRC identifier is used to confirm that two records correspond to a same media item. In other words, the ISRC identifier can be used as an attribute (e.g., a label) for training the machine-learning model.

In some embodiments, one or more attributes of the first plurality of attributes are determined to be irrelevant, and are therefore not used for training the machine-learning model 400. For example, plurality of attributes 404 include a subset, less than all, of the available attributes for the record, wherein the plurality of attributes 404 is selected as relevant for training the machine-learning model.

In some embodiments, as illustrated in FIG. 4A, each record of the first plurality of records 402 has a plurality of attributes 404 (e.g., the "Track Title" attribute 404-1; the "Performers" attribute 404-2, etc.). In some embodiments, the system generates training data (e.g., input 401) for the machine-learning model 400 by masking one or more portions of at least one attribute in the plurality of attributes 404. In some embodiments, as used herein, "masking" one or more portions of at least one attribute includes replacing one or more portions with one or more <M> tokens (e.g., to hide the portion), replacing one or more portions with one or more random tokens (e.g., to introduce errors), forgoing changing one or more portions, and/or a combination of using <M> tokens, random tokens, and unchanged tokens (e.g., 80% (or another percentage) of the masked portions are replaced by <M>, 10% (or another percentage) are replaced by a random token, and 10% (or another percentage) are unchanged). For example, the "Track Title" attribute 404-1 of the record 402-1 includes a masked portion (e.g., "<M>") between "Song A" and "C", where the "<M>" is not the actual value of that portion of the value of the "Track Title" attribute 404-1. As described herein, a masked portion (e.g., the masked portion "<M>" of the record 402-1) can be a symbolic identifier indicating to the machine-learning model that the underlying data represented by the symbolic identifier has been obfuscated (e.g., hidden), and therefore that the machine-learning model will be unable to process the actual value of the masked portion from the record. As such, the attribute **470*a* originally recited "Song A B C" but after masking a portion of attribute 470*a*, the training data that used as input 401 to the machine-learning model 400 is "Song A <M>C" (e.g., masking "B"). In some embodiments, one or more of the attributes of the plurality of attributes 404 is masked in its entirety (e.g., to simulate a missing field). For example, in some embodiments, the entire "Writers" attribute 404-3 is represented with an "<M>" or "None" value, indicating that the entire attribute 404-3** is masked.

In some embodiments, one or more attributes are tokenized, and one or more tokens of such respective attributes can be masked. As used herein, tokenization is a method of determining at least one token that corresponds to a respective attribute of a respective record. In some embodiments, a token represents a portion of the respective attribute. As a prophetic example, a media item title of "The First Media Item" can be tokenized into a set of tokens representing each word of the media item (e.g., "The", "First", "Media", "Item"). After the machine-learning model 400 receives the input 401 that includes the first plurality of records 402 with the masked portions, the machine-learning model produces an output 416 that includes a new version of the first plurality of records 402 with predicted values for each of the masked portions. For example, a masked attribute value of the input 401 can have a value of "Song A <M>C," where the "<M>" represents the masked portion of the attribute value, and the corresponding output attribute value of the output 416 can have a value of "Song A B C," where "B" is the predicted value of the masked portion of the masked attribute value 404-1. It should be noted that the predicted value of the masked portion illustrated in the output 416 can be incorrect as compared to an anchor record (e.g., a source of truth, the actual value of the masked portion, etc.). As will be discussed in more detail with respect to FIG. 4B, the machine-learning model 400 is trained by masking portions of an anchor record and performing operations to predict the masked portions of the attributes of each respective record of the first plurality of records (e.g., and comparing the predicted portions to the anchor record), in accordance with some embodiments. In some embodiments, the machine-learning model 400 can be trained to more accurately predict the masked portions based on various loss parameters, configured to measure distinct types of errors in the machine-learning model's prediction of values corresponding to the first plurality of records 402 provided as an input 401 to the machine-learning model 400. In some embodiments, although the machine-learning model 400 is trained to predict masked portions, the predicted masked portions are not used to produce the embeddings for subsequent records processed by the trained machine-learning model and/or to group two or more records into a respective group based on their embeddings. Thus, in some embodiments, the predicted masked portions are ancillary to the embeddings, which are produced from an intermediate layer of the trained machine-learning model 400.

FIG. 4B illustrates another visual representation of the operations shown in FIG. 4A, where the machine-learning model 400 receives the first plurality of records 402 that includes attributes having masked portions for at least some of the records (e.g., the record 402-1), and produces the output 416, which includes the first plurality of records 402 with predicted tokens and/or attributes replacing the masked portions of the attributes of the input 401. FIG. 4B illustrates training the machine-learning model 400. In some embodiments, the machine-learning model 400 also produces one or more embeddings 422 for each of the first plurality of records 402 during training. The embeddings generated for records of the first plurality of records are used to train the machine-learning model 400 by requiring that embeddings corresponding to records that represent a same media item are close together (e.g., measured by cosine distance) and embeddings corresponding to records that represent different media items are far apart, using a contrastive loss function (e.g., triplet or siamese loss). Additionally, FIG. 4B illustrates intermediary components of the machine-learning model 400 not explicitly shown in FIG. 4A.

As shown in FIG. 4B, the machine-learning model 400 includes a first attribute-level encoder 406, and a second attribute-level encoder 408. In some embodiments, the first attribute-level encoder 406 and/or the second attribute-level encoder 408 can include and/or receive inputs from one or more additional encoders configured to encode embeddings for respective tokens within attributes of the plurality of attributes 404 of each record (e.g., any number of encoders may be used to encode one or more attributes, such as one encoder per attribute or one encoder for all attributes). In some embodiments, attributes of a first type (e.g., titles, such as track and/or album titles) are encoded using the first attribute-level encoder, and attributes of a second type (e.g., names, such as an Artist, Writer, and/or Performer) are encoded using the second attribute-level encoder. For example, the first attribute-level encoder 406 is configured to generate attribute-level embeddings for the "Track Title" attribute 404-1, and an "Album Title" attribute 404-4. The second attribute-level encoder 408 is configured to generate attribute level embeddings for the "Performers" attribute 404-2 and the "Writers" attribute 404-3. In some embodiments, the first attribute-level encoder 406 generates a separate attribute-level embedding for each attribute provided to the first attribute-level encoder 406 (e.g., the "Track Title" attribute 404-1 and the album title attribute 404-4).

In some embodiments, the respective embeddings from the first attribute-level encoder 406 and the second attribute-level encoder 408 are then provided as inputs to the record-level encoder 410 (also referred to herein as a global encoder), which generates a record-level training embedding for each respective record of the first plurality of records 402 (e.g., the record 402-1). In some embodiments, one or more of the attributes of each record are provided directly to the record-level encoder 410, without being provided to any attribute-level encoders.

In some embodiments, while the machine-learning model 400 is being trained, the record-level training embedding for each record of the first plurality of records 402 is provided as an input to the decoder 412 (e.g., via path "A"), which predicts the masked portions of the attributes of the record (e.g., the masked portions of the record 402-1), as described above with reference to FIG. 4A. In some embodiments, the output of the record-level encoder 410 is also used to generate an embedding for the record (e.g., via path "B") during training.

For example, as will be discussed below, a second plurality of records 452 (e.g., distinct from the first plurality of records used for training the model) is input to a trained model (e.g., a trained model 450 in FIG. 4C), optionally without masking attributes of records in the second plurality of records 452. For example, after training the machine-learning model 400 using masked attributes, the second plurality of records 452 is input to the trained model 450 without masking attributes of the second plurality of records. In some embodiments, for the second plurality of records 452, the trained model 450 generates an embedding 456 for the record and uses the embedding to group a record of the second plurality of records 452 into one or more groups of two or more records (e.g., via path "B"). As such, the trained model is enabled to group similar records together in a group, even if the records have missing and/or incorrect attributes. In some embodiments, the trained model does not output predictions of missing, different and/or incorrect attributes of the records in the second plurality of records (e.g., the predictions are not of interest).

In some embodiments (along path "A"), the decoder 412 sends an input to a token prediction module 414, which can perform all or part of the operations to predict the masked portions of respective tokenized portions of each respective attribute of the respective record. In some embodiments, after the decoder 412 and/or the token prediction module 414 predicts the masked portions of one or more records of the first plurality of records, the output 416 of the model is evaluated. In some embodiments, the machine-learning model 400 is evaluated by determining a reconstruction loss 418 associated with the predicted masked portions.

In some embodiments (along path "B"), one or more of the outputs of the first attribute-level encoder 406, the second attribute-level encoder 408, and/or the record-level encoder 410 are input to an aggregation operation 420 for aggregating distinct data from the encoders. For example, the embeddings produced by the first attribute-level encoder 406, the second attribute-level encoder 408, and/or the record level encoder 410 include a plurality of embeddings that correspond to a single record, wherein aggregation operation 420 combines the plurality of embeddings such that a single embedding 422 is generated for a respective record. In some embodiments, the one or more embeddings 422 are evaluated based on one or more contrastive loss functions, such as a triplet loss 424 and/or a siamese loss 426. For example, two embeddings that correspond to a same media item (e.g., as determined using triplet loss 424 and/or siamese loss 426) should be close together (e.g., measured by a cosine distance between the embeddings), while two embeddings that correspond to different media items should be farther apart (e.g., measured by a cosine distance between the embeddings).

It will be understood that additional and/or alternative methods of evaluating the reconstructed output 416 and/or the one or more embeddings 422 can be applied. In some embodiments, the evaluation includes comparing the predicted values for the masked portions of the records (e.g., reconstructed output 403) of the first plurality of records 402 with the actual values (e.g., the attributes before masking) the first plurality of records 402. In some embodiments, the machine-learning model 400 is adjusted (e.g., during training) based on the values of one or more loss parameters (e.g., determined from reconstruction loss 418, triplet loss 424, and/or siamese loss 426, and/or other types of contrastive loss). In some embodiments, adjusting the machine-learning model 400 based on one or more of the calculated loss parameters includes adjusting one or more of the encoders (e.g., the first attribute-level encoder 406), such that subsequently providing the first attribute-level encoder 406 with a record from the first plurality of records 402 (e.g., the record 402-1) would cause the encoder to produce a different embedding than was produced the first time that the first attribute-level encoder received the record.

FIG. 4C illustrates the trained machine-learning model 450 (e.g., the machine-learning model 400 after it has processed some or all the records of the first plurality of records 402) receiving a second plurality of records 452 as inputs. In some embodiments, the token predictions produced via path A (described with reference to FIG. 4B) are disregarded (e.g., discarded) for one or more of the second plurality of records. In some embodiments, path A itself is optionally not used (e.g., no token prediction) occurs for one or more records of the second plurality of records (e.g., In some embodiments, the trained machine-learning model 450 does not process path A at all). That is, the machine-learning model, during training, predicts tokens (e.g., from masked attributes) and also (e.g., concurrently) produces embeddings 422, is optionally only used to produce embeddings 456 for a second plurality of records 452. In some embodiments, in accordance with generating embeddings for records from the second plurality of records 452, the trained machine-learning model 450 groups two or more of the records from the second plurality of records 452 into a group of similar media items (e.g., the first group 464).

In some embodiments, a clustering algorithm can be used to group two or more of the records. In some embodiments, the embeddings can be used to generate pairwise similarity scores between media items, including pairwise similarity scores between media items that includes at least one intermediate media item between the grouped media items. In some embodiments a cosine distance is calculated between two or more embeddings, wherein the records are grouped into a respective group in accordance with the cosine similarity calculated between the two or more embeddings representing the records (e.g., respective pairs of embeddings with a cosine distance less than a threshold amount are grouped together). In some embodiments, a second model is trained as a binary classifier for determining relationships between respective embeddings associated with respective records of the first plurality of records and/or the second plurality of records and is used (e.g., instead of or in addition to) the cosine similarity to determine whether pairs of embeddings are associated with grouped records.

As illustrated in FIG. 4C, the trained machine-learning model 450 produces embeddings for each record of a second plurality of records 452 (e.g., a record 452-1). In some embodiments, one or more of the first attribute-level encoder 406, the second attribute-level encoder 408, and/or the record-level encoder 410 that were used to train the machine-learning model 400 are used by the trained machine-learning model 450. In some embodiments, as described in more details with respect to FIG. 4B, the aggregation operation 420 is applied to one or more outputs and/or embeddings of the first attribute-level encoder 406, the second attribute-level encoder 408 and/or the record-level encoder 410 to generate a single embedding 456 for the respective record of the plurality of records.

In some embodiments, the one or more embeddings 456 (e.g., for the plurality of records 452) are used by a blocking layer 458, to block groups of media items that have a threshold level of similarity. In some embodiments, the blocking layer 458 is used to produce blocks of similar media items (e.g., a block 460). In some embodiments, the block 460 is used to determine a group of like media items (e.g., a group 1-464) by a matching layer 462. In some embodiments, the one or more embeddings 456 are used as an input to the matching layer 462 to determine groups of like media items based on respective similarities between the embeddings 456 for the second plurality of records 452.

As such, the trained machine-learning model 450 uses the embeddings of each record of the second plurality of records to group the two or more records of the second plurality of records into a first group 464. In some embodiments, the first group 464 corresponds to records associated with similar, but distinct media items (e.g., a live version of the media item, a remastered version of the media item, etc.). By training the model on records with masked attributes, the trained machine-learning model 450 is enabled to determine one or more embeddings 456 for records that are related, but not identical, and group the records according to their embeddings.

Groups of records, including the first group 464, generated by the trained machine-learning model can be used in multiple different contexts. For example, a user of an electronic client device (e.g., the client device 102) requests for a media item to be added to a playlist, either explicitly (e.g., using a user input or voice command), or via a content recommender (e.g., curated by the media-providing service). Before adding a media item corresponding to the first group 464 to the playlist, the client electronic device can determine whether any other media items from the first group 464 are already present in the playlist where the media item is to be added. In some embodiments, the device uses the groupings to determine which media items to add to a playlist and/or where to position respective media items within the playlist. In some embodiments, the device uses the groupings to evaluate criterion for generating (e.g., curating) a playlist. For example, in accordance with a determination that a first media item and a second media item are assigned to a same group, adding a threshold number of media items that are not in the same group between the first media item and the second media item in a playlist.

In some embodiments, the determination whether any other media items from the first group 464 are already present in the playlist can be one criterion of a plurality of criteria used to curate the playlist. For example, there may be other criteria (e.g., calibration, parental controls, etc.) why a media item would not be added to the playlist, and the resulting playlist can be a product of evaluating the one or more criteria. In some embodiments, the client electronic device can forgo adding the media item from the first group 464 based on determining that the playlist already includes one or more media items that are in the first group. In some embodiments, the client electronic device can add the media item to the playlist in a position that is a threshold distance away from any other media items in the first group 464.

In some embodiments, similar operations can be performed with respect to a list of media items provided to a user based on a search performed by the user. In some embodiments, the device uses the groupings to evaluate criterion for generating (e.g., displaying) search results. In other words, the user provides a search query that identifies media item, and/or a group that includes the identified media item (e.g., the first group). For example, the electronic device generates a list of media items that satisfies the search query. While generating the list of media items that satisfies the search query, the electronic device determines if there are any other media items from the first group 464 in the list of media items the search. In some embodiments, the electronic device forgoes adding one or more media items from the first group to the search results (e.g., the list of media items that satisfy the search query) (e.g., to avoid providing duplicate results) based on determining that there are already one or more media items from the first group in the search results. In some embodiments, rather than forgoing adding the one or more media items to the search results, it provides a visual indication in the displayed search results that the two or more like media items are both from the first group. In some embodiments, the electronic device provides a plurality of media items that belong to the same group. For example, the search query identifies a feature that corresponds to a group of media items, such that the search results correspond to all (or a portion, less than all) of the media items that belong to the group. For example, the user searches for "song A" and is provided with multiple versions of "song A," wherein each version of song A belongs to group A (e.g., an instrumental version, a remastered version, a live version, etc.).

In some embodiments, similar operations can be performed by the electronic device for providing recommendations to the user. In some embodiments, the media-content providing service curates or otherwise recommends media content items to the user (e.g., in a recommended playlist). In some embodiments, to avoid repetition within the recommended playlist, the media-content providing service forgoes including multiple media items from a same group. For example, even if the user has consumed multiple versions of the media item (as indicated by the user's historical listening data (e.g., playback history)), the recommended playlist only includes a subset, less than all, of the versions, thereby avoiding augmenting the selection process based on multiple versions of the same underlying song and/or podcast.

In some embodiments, a user may wish to select from multiple media items from the first group 464. For example, the result of a user search can result in a first version of a media item (e.g., a full version of a song by a first artist, A) being displayed, along with an indication that additional versions (e.g., from the first group 464) are available for listening. For example, the additional versions include an instrumental version of the song, a version of the song by a second artist, B (e.g., a cover of the song), and/or a live version of the song (e.g., performed by artist A). In some embodiments, the user provides a user input (e.g., a voice command, stating: "show me more of that") to cause the display of additional media items associated with records in the first group 464.

FIGS. 5A-5C are flow diagrams illustrating a method 500 of grouping similar media items using a machine learning model, in accordance with some embodiments. Method 500 may be performed at an electronic device (e.g., media content server 104 and/or electronic client device(s) 102) having one or more processors and memory storing instructions for execution by the one or more processors. In some embodiments, one or more of the operations of the method occur at a client device, at a server, a combination of both, etc. In some embodiments, the method 500 is performed by executing instructions stored in the memory (e.g., memory 212, FIG. 2, memory 306, FIG. 3) of the electronic device. In some embodiments, the method 500 is performed by a combination of the server system (e.g., including media content server 104 and CDN 106) and a client device. In some embodiments, one or more of the operations of the method 500 are performed by a machine-learning module of the electronic device (e.g., the machine-learning module 322 in FIG. 3).

Referring now to FIG. 5A, in performing the method 500, the electronic device obtains (502) a first plurality of records corresponding to a plurality of media items, wherein each record of the first plurality of records has at least one attribute of a plurality of attributes. For example, as shown in FIG. 4A, the record 402-1 has a plurality of attributes 404-1-404-4.

In some embodiments, the at least one attribute of the plurality of attributes includes (504) one or more of a title of a media item (e.g., the "Track Title" attribute 404-1; FIG. 4A), an album of the media item (e.g., the "Album Title" attribute 404-4; FIG. 4A), one or more performers of the media item (e.g., the "Performers" attribute 404-2; FIG. 4A), and one or more writers of the media item (e.g., the "Writers" attribute 404-3; FIG. 4A) corresponding to each record of the first plurality of records. In some embodiments, the plurality of attributes further includes lyrics, tempo, genre, producers, and/or one or more inherent properties of the media item. In some embodiments, the plurality of attributes includes an indicator attribute indicating whether the media item is of a certain type (e.g., a song, a podcast, a portion of a movie audio track, an audio clip associated with a short shareable content item, etc.).

In some embodiments, one or more of the records in the first plurality of records has a different number of attributes than the other records in the first plurality of records. In some embodiments, each record in the first plurality of records share a same set of possible attributes, but one or more records are missing and/or have incorrect information stored as one of the attributes (e.g., a first record is missing the album title attribute). In some embodiments, a first record associated with a podcast media item can include attribute that includes a list of guest speakers, and a second record associated with a song media item includes an attribute that includes array of sharable lyrical segments. In some embodiments, one or more records associated with one type of media item (e.g., a podcast) can be grouped with one or more records of another type of media item (e.g., songs) despite being associated with different media item types. For example, the trained machine-learning model can determine that a record associated with a segment of a podcast includes a live performance of a song and can proceed to group the record associated with the podcast into a group of records (e.g., the first group 464 of records from the second plurality of records 452) associated with records corresponding to the respective song performed on the podcast.

In some embodiments, ISRC identifiers disposed within raw data in one or more of the records of the first plurality of records include a title associated with the media item that matches the track title attribute of the corresponding media item (e.g., the "Track Title" attribute; FIG. 4A). In some embodiments, the machine-learning model uses ISRC identifiers that include titles that match the title attribute of the respective record they are associated with, and discards ISRC identifiers that don't include such matching titles. In some embodiments, the machine-learning model can use the ISRC identifier for training, and/or for providing annotations related to the corresponding record of the media item. In some embodiments, a higher weighting is applied to ISRC identifiers that include a same title as another media item, but include different metadata related to the respective media item. That is, for such ISRC identifiers, the machine-learning model applies a higher weight to the respective ISRC identifiers associated with the respective record, based on the ISRC identifiers having the same title but different metadata for other fields.

The electronic device trains (506) a machine-learning model by, for each record of the plurality of records, masking a portion of an attribute of the record (e.g., the attribute value of the "Album Title" attribute 404-4 in FIG. 4A, "Album <M>H<M>," includes two "<M>" substrings representing masked values of the masked attribute value). In some embodiments, as described above, masking includes hiding, removing, obscuring, or changing (e.g., to intentionally introduce an error in) the portion of the attribute. In some embodiments, training the machine-learning model further includes, for two embeddings of records corresponding to the same media item produced by the machine-learning model, determining (e.g., using a triplet loss and/or a siamese loss) whether the embeddings corresponding to a same media item are close to each other. For example, a triplet loss and/or a siamese loss is calculated for respective groupings based on embeddings generated for each respective record of the first plurality of records. In some embodiments, one or more of the attributes of a record of the first plurality of records does not have a masked portion (e.g., the attribute value of the "Writers" attribute 404-3, "Elle France," does not include a masked portion). In some embodiments, the first plurality of records is a first plurality of training records, and each record of the first plurality of records is a training record used to train the machine-learning model. In some embodiments, masking a portion of the attribute of the record includes replacing one or more tokens with one or more random tokens. In some embodiments, masking a portion of the record can include replacing a percentage of the tokens with the same token (e.g., the token remains unchanged after masking). In some embodiments, masking a portion of the attribute includes the following technique: 80% of the masked tokens are replaced by a mask that includes "<M>", 10% of the masked tokens are replaced by a mask that includes one or more random tokens, and 10% of the masked tokens are replaced with the same token. In some embodiments, between 60-90% of the masked tokens are replaced by a mask that includes "<M>", 5-15% of the masked tokens are replaced by a mask that includes one or more random tokens, and 5-15% are replaced with the same token (e.g., the token remains unchanged after masking), or another combination of these masking techniques is used. In some embodiments, between 5-30% of the tokens in respective attributes are masked during the training process, the masking based on the aforementioned distribution of masked portions.

The machine-learning model includes (508) an encoder and a decoder. The encoder produces a training embedding for the record, and the decoder predicts the masked portion of the attribute of the record, based on the training embedding.

In some embodiments, the encoder is (510) a first encoder that produces a first embedding based on the plurality of attributes. In some embodiments, the machine-learning model further includes a second encoder that produces a second embedding based on a subset, less than all, of the plurality of attributes. For example, in FIGS. 4B-4C, the first encoder is the record-level encoder 410, and the second encoder is the first attribute-level encoder 406. In some embodiments, there are additional encoders, including additional attribute-level encoders (e.g., the second attribute-level encoder 408; FIG. 4B).

In some embodiments, the second embedding (512) produced by the second encoder is an input to the first encoder. For example, in FIG. 4B, the first attribute-level encoder 406 produces the second embedding (e.g., an attribute-level embedding) and provides the second embedding to the record-level encoder 410 as an input. In some embodiments, an attribute-type encoding is added to every token embedding comprising the second embedding (e.g., signifying the attribute the token belongs to), before being input to the record-level encoder 410. In some embodiments, the attribute-type encoding is modified during training.

In some embodiments, the first encoder is (514) a first attribute-level encoder configured to generate a first attribute level embedding for a first attribute (e.g., the first attribute-level encoder 406; FIG. 4B). In some embodiments, the machine-learning model further includes a second attribute-level encoder configured to generate a second attribute-level embedding for a second attribute (e.g., the second attribute-level encoder 408; FIG. 4B). In some embodiments, the first attribute-level encoder and/or the second attribute-level encoder are configured to generate attribute-level embeddings for a plurality of attributes of the plurality of records. For example, as shown in FIGS. 4B-4C, the first attribute-level encoder 406 is configured to generate respective embeddings for each of the "Track Title" attribute 404-1 and the "Album Title" attribute 404-4.

In some embodiments, the first attribute-level embedding is a contextual embedding based on a native language of a user of the media-providing service. In some embodiments, the second attribute-level embedding is based on a plurality of constituent tokens of a respective attribute associated with the second attribute-level embedding. For example, in some embodiments, a first subset of attributes can be received in different languages based on the native language from which location they were sourced (e.g., a track title or alias for an associated media item of the record), and the machine-learning model (e.g., the respective encoder(s) configured to process the attribute) applies contextual embeddings to these attributes (e.g., each token of the attribute is assigned a value based on the respective token's context). In some embodiments, a second subset of attributes can be received and/or translated in a single language (e.g., English), and the machine-learning model applies embeddings to these attributes.

In some embodiments, the decoder predicts the masked portion of the attribute of the record based on one or more of a reconstruction loss parameter. In some embodiments, the reconstruction loss parameter is used while training the machine-learning model, but the reconstruction loss parameter is not used when grouping the two or more records of the second plurality of records (e.g., 524; FIG. 5B).

Turning now to FIG. 5B, the electronic device uses (516) the trained machine-learning model to produce an embedding for each record of a second plurality of records (e.g., the second plurality of records 452; FIG. 4C). In some embodiments, the second plurality of records is distinct from the first plurality of records (e.g., includes records that are not included in the first plurality of records). For example, after training the machine-learning model (e.g., including masking portions of attributes of the training data), the second plurality of records is input into the trained machine-learning model.

In some embodiments, the embedding is (518) a first embedding, and a tokenizable attribute of each of the second plurality of records is tokenized into a plurality of tokens.

In some embodiments, a plurality of token embeddings is generated (520) for the plurality of tokens of the tokenizable attribute (e.g., pretrained embeddings using a text classification library, such as fastText). In some embodiments, more than one token embeddings are generated. In some embodiments, scaled dot-product attention is applied to each token of the plurality of tokens of the attribute. In some embodiments, based on the scaled dot-product attention applied to each token, a positional encoding (e.g., a positional token embedding) is applied to each token of the plurality of tokens of the attribute.

In some embodiments, a second embedding can be generated (522) for each of the second plurality of records based on two or more of the plurality of token embeddings (e.g., an aggregation based on the plurality of token embeddings). In some embodiments, aggregated attribute embeddings are further aggregated with one or more other attributes of each respective record into respective tuple signatures representing two or more attributes of each of the second plurality of records (e.g., a combined signature that includes embeddings for the "Performers" attribute 404-2 and the "Writers" attribute 404-3 in FIG. 4A). In some embodiments, the grouping of two or more records of the second plurality of records is based at least in part on matching the respective tuple signatures of each of the two or more records in the first group. In some embodiments, a softmax function (e.g., softargmax, normalized exponential function, etc.) is used to match the tuple signatures of the two or more records of the second plurality of records. The trained machine-learning model groups (524) two or more records of the second plurality of records into a first group based on the embeddings of the two or more records. For example, the trained machine-learning model 450 in FIG. 4C groups two or more records of the second plurality of records 452 into the first group 464 of the second plurality of records 452.

In some embodiments, grouping the two or more records of the second plurality of records includes (526) deduplicating records that correspond to a same media item (e.g., or a similar media item associated with the same underlying content, such as distinct performances of a same track). For example, the first group 464 of the second plurality of records 452 in FIG. 4C includes a deduplicated plurality of similar media items. In some embodiments, each of the deduplicated records in the first group have been compared against an anchor record corresponding to a media item. In some embodiments, the first group includes records corresponding to media items that are distinct from the media item corresponding to the anchor record. For example, a deduplicated media item included in the first group can be a remastered version, a live version, and/or an acoustic version of the media item corresponding to the anchor record.

In some embodiments, grouping the two or more records of the second plurality of records includes (528): (i) analyzing the second plurality of records using a blocking layer, the blocking layer configured to identify a candidate group including a plurality of candidate records greater than the two or more records of the second plurality of records, and (ii) analyzing the plurality of candidate records using a matching layer, different from the blocking layer, configured to identify a subset of the plurality of candidate records, wherein the two or more records of the first group include the subset of the plurality of candidate records. For example, FIG. 4C illustrates records from the second plurality of records 452 being provided to the blocking layer 458, where two or more records may first be placed into the block 460 (e.g., "Block A"). The block 460 can then be provided to the matching layer 462 which can determine which records of the block 460 to place in the group 464 (e.g., "Group 1").

Turning now to FIG. 5C, in some embodiments, the machine-learning model determines (530) that a media item corresponding to a first record of the second plurality of records corresponds to a first media item type. For example, the first record corresponds to a media item that is a song, a podcast, a video, or other type of media item.

In some embodiments, in response to (532) a request to add a first media item corresponding to a first record of the second plurality of records to a playlist associated with the first electronic device, the electronic device determines the first media item is associated with the first group, based on a respective embedding for the first record.

In accordance with (534) a determination that the playlist includes a second media item that belongs to the first group, the electronic device foregoes adding the first media item to the playlist to be played back at the first electronic device. In other words, the system does not add a media item if it is repetitive, as indicated by the first media item belonging to a same group as the second media item. As such, the electronic device deduplicates media items (e.g., similar media items that are grouped together) within the playlist.

In some embodiments, in response to a request for a third media item, the electronic device identifies (536) that the third media item is grouped into a first respective group, the electronic device selects a record from the first respective group based on one or more acoustic parameters (e.g., the record associated with a music track that has the highest sound quality based of the tracks associated with records in the group).

In some embodiments, the electronic device provides (538) a media item corresponding to the selected record to the first electronic device (e.g., streaming and/or displaying in a user interface as a search result).

In some embodiments, in response to (540) a request for a fourth media item, the electronic device identifies that the fourth media item is grouped into a second respective group.

In some embodiments, the electronic device selects (542) a record from the second respective group based on respective play counts of respective records in the second group and provide the selected record to the first electronic device. In some embodiments, the electronic device identifies a selected record based on the selected record having the lowest play count of the respective records in the first group. In some embodiments, the selection distribution is based on one or more selection criteria including, for example, a relative royalty rate, artist preference, respective play count of the corresponding media items, etc.

In some embodiments, the electronic device, after determining the first group, receives a request (e.g., a search query) for an attribute, or a media item, or another feature that is associated with the first group, and provides (e.g., displays in a list, or streams) a plurality of media items from the first group. For example, the electronic device provides a user with all (or a subset, less than all) of the identified (e.g., grouped) versions of a media item (e.g., track). For example, the electronic device (or a presentation device communicatively coupled to the electronic device) displays indications of one or more live versions of a track, a cover by another artist of the track, a remix of the track, remastered version, "greatest hits" that includes another version of the track, etc. For example, a user provides a search query for "Track A" and the electronic device returns the records that are grouped in a same group as "Track A."

In some embodiments, the machine-learning model determines that a media item corresponding to a first record of the second plurality of records corresponds to a first media item type (e.g., a classical music composition comprising no lyrics). In some embodiments, in accordance with a determination that the first record corresponds to the first media item type, determining that one or more attributes of the first record are not to be used by the machine-learning model for grouping two or more records of the second plurality of records into the first group (e.g., one or more attributes are substantially irrelevant in grouping the second plurality of records). A person of skill in the art will appreciate that in some circumstances, one or more attributes that are considered less relevant than other attributes can still have some relevance in grouping records. In some embodiments, the one or more attributes that are determined to be substantially irrelevant are given a lower weighting with respect to the grouping of the two or more records of the second plurality of records.

Although FIGS. 5A-5C illustrate various logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising: at a first electronic device associated with a media-providing service, the first electronic device having one or more processors and memory storing instructions for execution by the one or more processors: obtaining a first plurality of records, each of the plurality of records corresponding to a plurality of media items, stored in one or more content distribution networks (CDNs) of the media-providing service, wherein each record of the first plurality of records has at least one attribute of a plurality of attributes; training a machine-learning model by, for each record of the first plurality of records, masking a portion of an attribute of the record, wherein: the machine-learning model comprises an encoder and a decoder; the encoder produces a training embedding for the record; and the decoder predicts the masked portion of the attribute of the record, based on the training embedding, wherein the encoder and the decoder are trained together based on the predicted masked portion of the attribute of each record; using the encoder of the trained machine-learning model to produce an embedding for each record of a second plurality of records, wherein one or more of the second plurality of records have missing and/or incomplete attributes, and producing the embeddings does not include using the decoder to predict the missing and/or incomplete attributes; and grouping two or more records of the second plurality of records into a first group based on the embeddings of the two or more records, wherein the grouping the two or more records of the second plurality of records comprises deduplicating records that correspond to a same media item, and the deduplicating records that correspond to the same media item comprises forgoing presenting one or more of records that correspond to the same media item in the media-providing service.

2. The method of claim 1, further comprising:

in response to a request to add a first media item corresponding to a first record of the second plurality of records to a playlist associated with the first electronic device;

determining the first media item is associated with the first group, based on a respective embedding for the first record; and in accordance with a determination that the playlist includes a second media item that belongs to the first group, forgoing adding the first media item to the playlist to be played back at the first electronic device.

3. The method of claim 1, wherein:

the at least one attribute of the plurality of attributes includes one or more of the group consisting of: a title of a media item, an album of the media item, one or more performers of the media item, and one or more writers of the media item corresponding to each record of the first plurality of records.

4. The method of claim 1, wherein:

the encoder is a first encoder that produces a first embedding based on the plurality of attributes, and the machine-learning model further comprises a second encoder that produces a second embedding based on a subset, less than all, of the plurality of attributes, wherein the second embedding produced by the second encoder is an input to the first encoder.

5. The method of claim 4, wherein:

the first encoder is a first attribute-level encoder configured to generate a first attribute-level embedding for a first attribute; and the machine-learning model further comprises a second attribute-level encoder configured to generate a second attribute-level embedding for a second attribute.

6. The method of claim 5, wherein:

the first attribute-level encoder is configured to generate the first attribute-level embedding for one or more of a title attribute or an album attribute; and the second attribute-level encoder is configured to generate the second attribute-level embedding for one or more of a writer attribute or a performer attribute.

7. The method of claim 1, further comprising:

in response to receiving a request for a third media item, identifying that the third media item is grouped into a first respective group;

selecting a record from the first respective group based on one or more acoustic parameters; and providing a media item corresponding to the selected record to the first electronic device.

8. The method of claim 1, further comprising:

receiving, from the first electronic device, a request for a fourth media item;

in response to receiving the request for the fourth media item, identifying that the fourth media item is grouped into a second respective group;

selecting a record from the second respective group based on respective play counts of respective records in the second respective group; and providing the selected record to the first electronic device.

9. The method of claim 1, wherein grouping two or more records of the second plurality of records into the first group further comprises:

analyzing the second plurality of records using a blocking layer, the blocking layer configured to identify a candidate group including a plurality of candidate records greater than the two or more records of the second plurality of records; and analyzing the plurality of candidate records using a matching layer, different from the blocking layer, configured to identify a subset of the plurality of candidate records, wherein the two or more records of the first group include the subset of the plurality of candidate records.

10. The method of claim 1, wherein:

the machine-learning model determines that a media item corresponding to a first record of the second plurality of records corresponds to a first media item type; and in accordance with a determination that the first record corresponds to the first media item type, determining that one or more attributes of the first record are not to be used by the machine-learning model for grouping two or more records of the second plurality of records into the first group.

11. The method of claim 1, wherein:

the embedding is a first embedding;

a tokenizable attribute of each of the second plurality of records is tokenized into a plurality of tokens;

a plurality of token embeddings is generated for the plurality of tokens of the tokenizable attribute; and a second embedding is generated for each of the second plurality of records based on two or more of the plurality of token embeddings.

12. A computer system, comprising: one or more processors; and memory storing one or more programs for execution by the one or more processors, the one or more programs comprising instructions for performing a set of operations, comprising: obtaining a first plurality of records, each of the plurality of records corresponding to a plurality of media items, stored in one or more content distribution networks (CDNs) of the media-providing service, wherein each record of the first plurality of records has at least one attribute of a plurality of attributes; training a machine-learning model by, for each record of the first plurality of records, masking a portion of an attribute of a training record, wherein: the machine-learning model comprises an encoder and a decoder; the encoder produces a training embedding for the training record; and the decoder predicts the masked portion of the attribute of the training record, based on the training embedding, wherein the encoder and the decoder are trained together based on the predicted masked portion of the attribute of each record; using the encoder of the trained machine-learning model to produce an embedding for each record of a second plurality of records, wherein one or more of the second plurality of records have missing and/or incomplete attributes, and producing the embeddings does not include using the decoder to predict the missing and/or incomplete attributes; and grouping two or more records of the second plurality of records into a first group based on the embeddings of the two or more records, wherein the grouping the two or more records of the second plurality of records comprises deduplicating records that correspond to a same media item, and the deduplicating records that correspond to the same media item comprises forgoing presenting one or more of records that correspond to the same media item in the media-providing service.

13. The computer system of claim 12, the one or more programs further comprising instructions for:

in response to a request to add a first media item corresponding to a first record of the second plurality of records to a playlist associated with a first electronic device;

determining the first media item is associated with the first group, based on a respective embedding for the first record; and in accordance with a determination that the playlist includes a second media item that belongs to the first group, forgoing adding the first media item to the playlist to be played back at the first electronic device.

14. The computer system of claim 12, wherein:

the at least one attribute of the plurality of attributes includes one or more of the group consisting of: a title of a media item, an album of the media item, one or more performers of the media item, and one or more writers of the media item corresponding to each record of the first plurality of records.

15. The computer system of claim 12, wherein:

the encoder is a first encoder that produces a first embedding based on the plurality of attributes, and the machine-learning model further comprises a second encoder that produces a second embedding based on a subset, less than all, of the plurality of attributes, wherein the second embedding produced by the second encoder is an input to the first encoder.

16. The computer system of claim 15, wherein:

the first encoder is a first attribute-level encoder configured to generate a first attribute- level embedding for a first attribute; and the machine-learning model further comprises a second attribute-level encoder configured to generate a second attribute-level embedding for a second attribute.

17. The computer system of claim 16, wherein:

the first attribute-level encoder is configured to generate the first attribute-level embedding for one or more of a title attribute or an album attribute; and the second attribute-level encoder is configured to generate the second attribute-level embedding for one or more of a writer attribute or a performer attribute.

18. A non-transitory computer-readable storage medium storing one or more programs configured for execution by a computer system, the one or more programs comprising instructions for performing a set of operations, comprising: obtaining a first plurality of records, each of the plurality of records corresponding to a plurality of media items, stored in one or more content distribution networks (CDNs) of the media-providing service, wherein each record of the first plurality of records has at least one attribute of a plurality of attributes; training a machine-learning model by, for each record of the first plurality of records, masking a portion of an attribute of a training record, wherein: the machine-learning model comprises an encoder and a decoder; the encoder produces a training embedding for the training record; and the decoder predicts the masked portion of the attribute of the training record based on the training embedding, wherein the encoder and the decoder are trained together based on the predicted masked portion of the attribute of each record; using the encoder of the trained machine-learning model to produce an embedding for each record of a second plurality of records, wherein one or more of the second plurality of records have missing and/or incomplete attributes, and producing the embeddings does not include using the decoder to predict the missing and/or incomplete attributes; and grouping two or more records of the second plurality of records into a first group based on the embeddings of the two or more records, wherein the grouping the two or more records of the second plurality of records comprises deduplicating records that correspond to a same media item, and the deduplicating records that correspond to the same media item comprises forgoing presenting one or more of records that correspond to the same media item in the media-providing service.

* * * * *